United States Patent Office 3,691,065
Patented Sept. 12, 1972

3,691,065
SELECTIVE TEMPERATURE CONTROL OF CATALYSTS
John H. Estes, Wappingers Falls, and Burton H. Bartley, Fishkill, N.Y. (Both % Texaco Inc., P.O. Box 509, Beacon, N.Y. 12508)
Filed July 17, 1970, Ser. No. 55,650
Int. Cl. C10g *15/00*
U.S. Cl. 208—159                                    6 Claims

ABSTRACT OF THE DISCLOSURE

Conducting a catalytic reaction with a dual function catalyst comprising two catalytic constituents, one of which is caused to function at a somewhat more elevated temperature than the other catalytic constituent by the action of a radio frequency field sufficient to selectively raise the temperature of the first named catalytic constituent a substantial amount.

---

Figure 1:
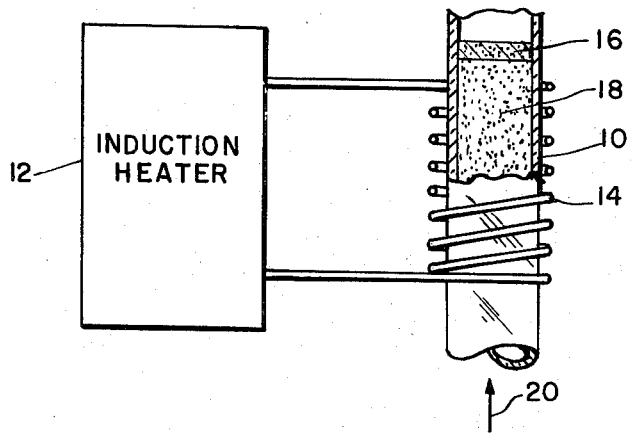

The present invention relates to catalytic reactions and particularly to reactions conducted by dual function catalysts, namely those composed of independent, heterogenous constituents which respectively promote separate reactions in the total transformation being promoted by the overall reaction.

Thus there has been developed a class of catalysts composed of constituents which simultaneously but independently, promote more than one function and which are referred to herein as dual function catalysts.

By way of example, the isomerization of normal hexane to isohexane over a platinum-silica alumina catalyst is believed to proceed in two stages. In the first of these the platinum functions as a dehydrogenation catalyst to promote the conversion of the normal hexane to an active intermediate by extraction of a hydrogen ion. The silica alumina thereafter converts the active intermediate to the mixed isomers which are then reversibly hydrogenated to yield the isomerate product.

There are a great many dual function catalytic reatcions of this type which are used to effect well known, simultaneously but independent catalytic functions, such as, for example, nickel on zeolite, nickel on alpha alumina and iron on zeolite.

These latter catalysts are usually formed by depositing the metallic constituent upon the non-metallic constituent.

Since only by unlikely fortuity could both of the catalyst constituents operate most effectively at the same temperature, the art is therefore always faced with the necessity for selecting a compromise operating temperature, which is relatively unfavorable to either one or both of the constituents. That is to say, since it has been hitherto necessary to maintain such a reactor at some definite temperature, this cannot ordinarily be a temperature which is simultaneously favorable to both catalyst constituents.

The present invention overcomes this difficulty in large measure by controlling temperatures so that in certain cases the respective functional components are each caused to operate at a temperature more closely approximating its optimum. This is accomplished by conducting the operation within a reactor maintained at a predetermined temperature level favorable to one of the constituents while selectively raising the temperature of the other functional constituent to a different level more appropriate to its specific catalytic function.

This latter result is effected by means of an induction heater, namely by the application of a radio frequency field to selectively heat one of said functional constituents without supplying energy to the other constituent. In brief, one is heated, the other is not. This, therefore, calls for a dual function catalyst comprising two catalytic constituents or elements, one of which is an electrically conducting ferromagnetic material; the other of the dual function catalysts being an insulating substance, namely one which has insufficient electrical conductivity to enable heating by induction from the radio frequency field.

Therefore, the invention has particular application to dual function catalysts comprising a ferromagnetic constituent such as nickel, iron, cobalt, or mixture of metals in which ferromagnetism is present in the mixture, e.g., platinum-iron, deposited on any suitable, electrically insulating catalyst constituent such as silica, alumina, zeolite and various combinations thereof.

It is also particularly applicable to catalytic reactions wherein the insulating material has an optimum catalytic temperature somewhat lower than that of the preferred operating temperatures of the metallic catalyst constituent. That is to say, the catalytic function of the electrically insulating constituent is favored by operating temperatures somewhat lower than the optimum operating temperatures of the metallic catalyst which effects a separate catalytic function.

Thus, referring to the initital example given above, it appears that the function of the platinum in a platinum-iron-silica alumina catalyst would exhibit increased activity, at temperatures greater than those at which the silica alumina functions, to favor the production of the iso compounds.

Among the advantages which will be obvious in view of the foregoing is the fact that this permits the use of somewhat smaller quantities of platinum in the catalyst.

Another feature of the present invention is that it can be applied to the aforementioned platinum catalyst and to other dual function catalysts in which the metallic constituent is not a ferromagnetic metal if sufficient of a ferromagnetic constituent is present in order to make it responsive to induction heating. The ferromagnetic material may be metallic or even non-metallic, such as manganese ferrite or cobalt ferrite.

A further important and somewhat surprising benefit of the present invention results from the fact that it is applicable rather broadly and generally to various catalytic contacting techniques. These significantly include catalysis conducted in a fluidized bed.

Since one of the characteristics which makes fluidization so valuable in the chemical field is an inherent tendency to temperature uniformity, it is quite surprising that a selective, non-uniformity can be maintained. An attempt at a purely theoretical explanation of this is that continual maintenance of a temperature differential inherently calls for a temperature drain which can keep the cooler constituent from overheating by contact with the warmer constituent. This is what the fluidization is particularly adapted to accomplish.

Therefore, a summary of the present invention calls for conducting catalytic operations on a dual function catalyst, one of the functional constituents of which is electrically insulating, and functions at a somewhat lower temperature, while the other is metallic and adapted to be inductively heated either itself or by the association therewith of an electrically conductive ferromagnetic metal.

Referring now to the figures of the drawing, FIG. 1 is a diagrammatic sketch showing an induction heater associated with a catalytic reactor in accordance with the present invention. The reaction chamber is formed by a tubular member 10, preferably of some suitable non-conductive material. The reaction chamber tube may, however, be made of conducting material if the induction coils are placed inside the reactor. Induction heater 12 supplies a high frequency source of energy to coil 14 which embraces the reactor 10. The frequency of the energy supplied by the unit 12 is sufficient to induce energy into the conductive ferromagnetic materials within the reaction zone 10 as by eddy currents or magnetic (hysteresis) effects.

Permeable separation means, such as screening 16 at the top and also at the bottom of the reaction zone, enclose a mass of catalyst 18. The reactant fluid passes thru the tube 10 in the direction of the arrow 20 or otherwise. The reaction zone 18 itself may be held at reaction temperature by any suitable means not shown. For example, the normal operating temperature of the reaction zone, namely the apparent temperature measured therein by ordinary means, may be maintained simply by correspondingly controlling the temperature of the entering reactant fluids supplied to the reaction zone. Or this temperature may be maintained by an external source of heat.

Also, as previously intimated, the catalyst 18 may be finely divided particles suitably aerated and expanded by the upflowing gases in the reaction zone to produce the effect known as fluidization. Of course, the fixed or moving bed techniques may also be adopted.

To the arrangement described above, the present invention adds the coil 14 which embraces the reaction zone, namely the tube 10. This is, in turn, connected as shown, to a source of radio frequency energy 12, colloquially referred to as an induction heater. The coil is similarly called an induction coil since its effect is to induce energy into metallic constituents within its sphere, presumably in the form of eddy currents or magnetic hysteresis effects which thereby selectively heat the metallic, and preferably the ferromagnetic, component of the catalyst.

It has been found that under the influence of such radio frequency energy the apparent temperature of the reaction zone, as measured by ordinary thermometric means, may be substantially lower (as much as 100–200° C.) than the actual temperature (established by its function) of the metallic catalyst.

Figure 2:
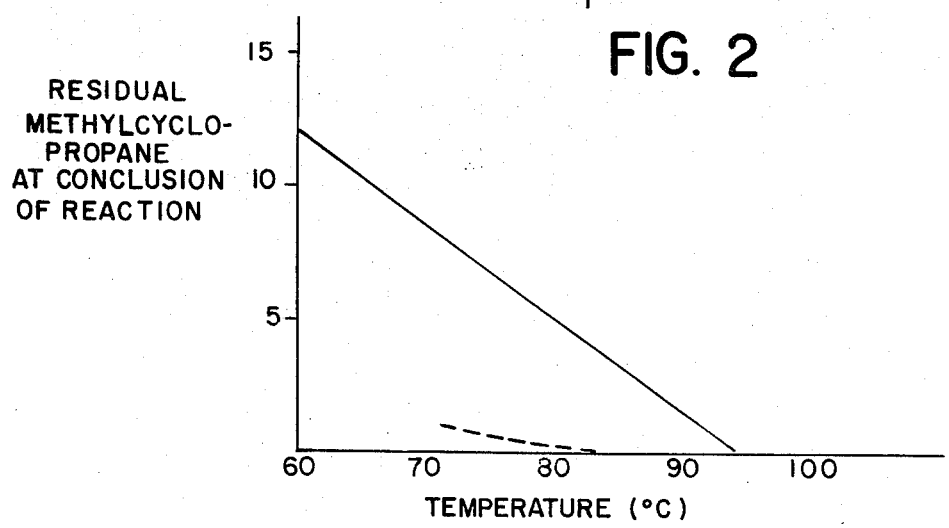

Thus, for example, FIG. 2 of the drawings diagrams the catalytic reactions effected by a dual function catalyst comprising 9.1% nickel on Alon-C (alpha alumina), namely the decomposition and hydrogenation of methylcyclopropane into normal butane and isobutane. The solid line curve represents the residual proportion of the charge material, namely methylcyclopropane remaining after the conclusion of the experimental reaction conducted under identical conditions except for the temperature variations indicated.

Subsequently, in accordance with the present experiment, the reactor was then subjected to the influence of a coil carrying a radio frequency of 4 mc. at a fixed energy level as controlled by a Lepel induction heater. The dotted line curve shows almost complete consumption of the methylcyclopropane charge at temperatures which otherwise would have resulted in considerable residual charge material. This indicates that the application of the indicated high frequency energy effects a favorable change in temperature of the nickel constituent of the dual function catalyst.

Figure 3:
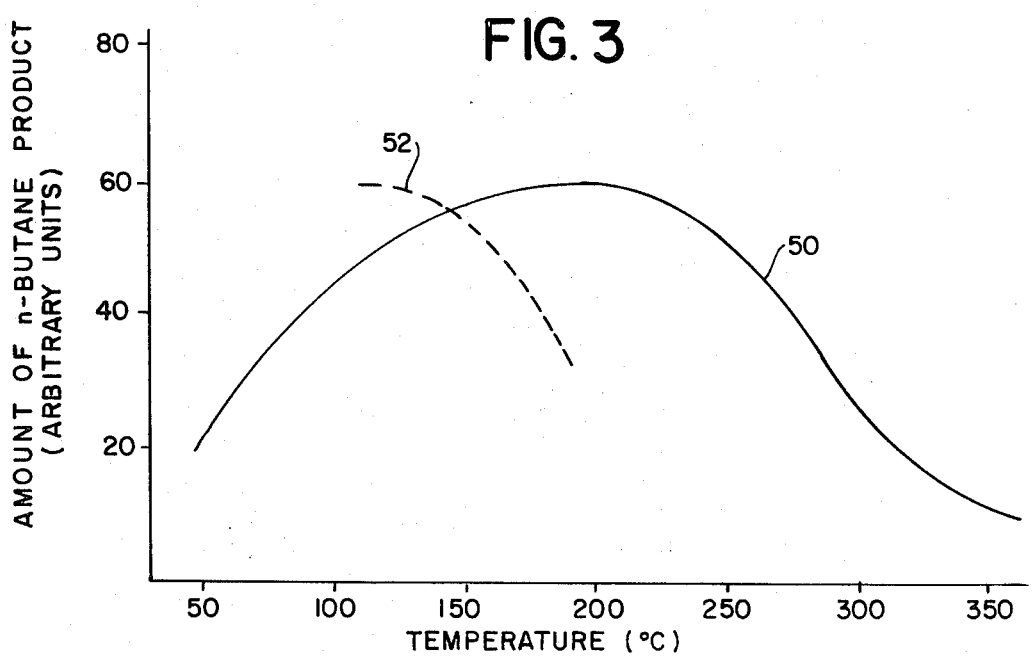

FIG. 3 of the drawing depicts the results of a further series of experiments involving the decomposition and hydrogenation of methylcyclopropane in the presence of an iron-silica catalyst.

In this instance predetermined quantities of the charge material in the presence of a hydrogen carrier gas are passed thru a reaction zone under conditions maintained constant, except for the apparent temperature indicated. The ordinates of curve 50 indicate the measured quantity of normal butane produced by the reaction at the indicated apparent temperatures. Curve 52, on the other hand, depicts the results of experiments conducted under otherwise identical conditions (and at the apparent catalyst bed temperatures indicated) but in each case, subject to the application of a radio frequency field as in the previous experiment.

From this it is apparent that the inductive heating of the iron component has contributed materially to operation at appreciably lower apparent temperatures.

Accordingly, therefore, the present invention provides an effective way of selectively approximating optimum temperatures in the case of a dual function catalyst having metallic and non-metallic functional constituents respectively, the metal constituents of which preferentially function at a somewhat higher temperature. This obviously forms an effective basis for improving selectivity and overall conversion rates.

We claim:

1. In the process of conducting a catalytic reaction wherein a fluid chemical charge material is passed in contact with a solid, dual function catalyst, which dual function catalyst is composed of two essential, separately functioning, catalytic constituents comprising respectively a relatively non-electrically conducting constituent and an electrically conductive constituent, conducting said reaction in a reaction zone at a predetermined, apparent reaction zone temperature.

and causing the conductive constituent to function at a predetermined, relatively more elevated temperature by subjecting said reaction zone to the radio frequency field of a high frequency induction heater sufficiently to selectively raise the temperature of said electrically conductive constituent a substantial amount.

2. A method as called for in claim 1 wherein said electrically conductive constituent comprises a metal.

3. A method as called for in claim 1 wherein said electrically conductive constituent comprises a ferromagnetic conductive metal.

4. The method as called for in claim 1 wherein said electrically conductive constituent comprises a catalytic metal associated with ferromagnetic material in sufficient quantity to promote said temperature increase.

5. The method as called for in claim 1 wherein said dual function catalyst employed in said catalytic reaction comprises, as the electrically conducting constituent, a metallic catalyst which functions optimally at a somewhat higher reaction temperature than the non-conductive catalytic constituent of said catalyst.

6. The method as called for in claim 1 wherein said catalytic reaction is carried out with the catalyst in fluidized condition.

References Cited
UNITED STATES PATENTS 2,432,934  12/1947  Rasor _____ 208—159

HERBERT LEVINE, Primary Examiner

U.S. Cl. X.R.

23—1 B, 1 E; 260—676